United States Patent
Chalieux et al.

(10) Patent No.: US 6,641,791 B2
(45) Date of Patent: Nov. 4, 2003

(54) GENERATION OF BORON-TRIFLUORIDE AND SULPHURIC ACID FROM BORON TRIFLUORIDE HYDRATE

(75) Inventors: Jean-Paul Chalieux, Irigny (FR); Christian Pralus, Saint Cyr au Mont d'Or (FR)

(73) Assignee: Elf Atochem, Puteaux (FR)

( * ) Notice: Subject to any disclaimer, the term of this patent is extended or adjusted under 35 U.S.C. 154(b) by 0 days.

(21) Appl. No.: 09/207,146

(22) Filed: Dec. 8, 1998

(65) Prior Publication Data

US 2003/0147803 A1 Aug. 7, 2003

(30) Foreign Application Priority Data

Dec. 8, 1997  (FR) ............................................. 97 15489

(51) Int. Cl.$^7$ ..................... C01B 35/06; C01B 17/74; C01B 17/90
(52) U.S. Cl. ..................... 423/293; 423/525; 423/531
(58) Field of Search ................. 423/531, 293, 423/522, 525

(56) References Cited

U.S. PATENT DOCUMENTS

| | | | | |
|---|---|---|---|---|
| 3,856,673 A | * | 12/1974 | De La Mater et al. | 423/531 |
| 4,085,016 A | * | 4/1978 | Janjua et al. | 423/531 |
| 4,265,871 A | * | 5/1981 | Felice, Jr. et al. | 423/293 |
| 4,520,006 A | * | 5/1985 | Laviron et al. | 423/293 |
| 4,781,909 A | * | 11/1988 | Evans et al. | 423/293 |
| 4,943,423 A | | 7/1990 | Evans et al. | 423/293 |
| 4,956,513 A | | 9/1990 | Walker et al. | 585/525 |
| 5,026,535 A | * | 6/1991 | Jonsson et al. | 423/525 |
| 5,536,484 A | | 7/1996 | Duclaux et al. | 423/276 |

FOREIGN PATENT DOCUMENTS

| | | | | |
|---|---|---|---|---|
| DE | 2027389 | * | 12/1971 | 423/531 |
| EP | 0 027 607 | * | 4/1981 | 423/531 |
| EP | 364 815 | | 4/1990 | |
| EP | 0 378 873 | * | 7/1990 | 423/531 |
| JP | 58-32003 | * | 2/1983 | 423/531 |
| JP | 59-50018 | | 3/1984 | |
| SU | 601222 | * | 4/1978 | 423/531 |
| WO | WO 90/06284 | | 6/1990 | |

OTHER PUBLICATIONS

Weast, "Handbook of Chemistry and Physics", 52$^{nd}$ edition, p. 3–74 1971 (No month).*
French Search Report dated Jul. 10, 1998.

* cited by examiner

*Primary Examiner*—Ngoc-Yen Nguyen
(74) *Attorney, Agent, or Firm*—Smith, Gambrell & Russell, LLP

(57) ABSTRACT

The invention relates to the preparation of $BF_3$ and $H_2SO_4$ of commercial grade from boron trifluoride hydrate effluents containing organic impurities. The process consists essentially in reacting the said effluent with oleum, in recovering the gaseous boron trifluoride thereby liberated and in subjecting the sulphuric acid by-product to treatment with hydrogen peroxide and to purging with air.

27 Claims, No Drawings

GENERATION OF BORON-TRIFLUORIDE AND SULPHURIC ACID FROM BORON TRIFLUORIDE HYDRATE

FILED OF THE INVENTION

The present invention relates to the field of boron trifluoride and sulphuric acid and relates more particularly to the conversion of industrial effluents of boron trifluoride hydrate to boron trifluoride and sulphuric acid.

BACKGROUND OF THE INVENTION

Boron trifluoride is a gas which is principally used in industry as a catalyst in a large number of reactions: polymerization, esterification, alkylation and isomerization. Customarily, after use, the boron trifluoride is treated with an aqueous sodium hydroxide solution and the resulting effluent, made up of derivatives containing fluorine and borine, is discarded.

In order to avoid these fluorine- and borine-containing wastes, the boron trifluoride can be recovered after use, at the end of reaction, in the form of solutions of $BF_3$ hydrate which are obtained on the one hand by bringing the $BF_3$ into contact with water and, on the other hand, by washing the organic compounds formed in the reaction catalysed by $BF_3$ with water (see, for example, the patent EP 364 815).

Owing to the presence of—essentially organic—impurities, the solutions of boron trifluoride hydrate are generally coloured to a greater or lesser extent, it being possible for their content of organic carbon to range from several ppm to several thousand ppm (customary values: from approximately 10 to 1000 ppm).

The patent U.S. Pat. No. 5,536,484 describes a process for upgrading technical $BF_3$ hydrates in the form of aqueous solutions of tetrafluoroboric acid corresponding to commercial specifications. However, the final step of decolouring requires the use of an active carbon which must be destroyed after use.

Another means of upgrading a technical $BF_3$ hydrate is set out in the patent EP 364 815 and consists of regenerating the boron trifluoride by treating the technical hydrate with sulphuric acid, oleum or $SO_3$. Unfortunately, the sulphuric acid resulting from this operation has a yellow to black coloration, making it unsuitable for use without prior purification treatment.

On the other hand, organic substances and carbon dioxide are unacceptable in a commercial $BF_3$ intended for applications in catalysis. The current commercial product must contain less than 10 mg of organic carbon and less than 5 mg of $CO_2$ per kg of $BF_3$.

DESCRIPTION OF THE INVENTION

A process has now been found which enables a boron trifluoride and a sulphuric acid both of which correspond to commercial specifications to be prepared from technical $BF_3$ hydrate and oleum. This process is particularly advantageous in that it produces no waste and does not require the use of active carbon.

The process according to the invention comprises in succession the following steps:

(a) reacting oleum with the technical $BF_3$ hydrate, (b) recovering the gaseous $BF_3$ thereby liberated, and (c) subjecting the sulphuric acid by-product of step (a) to treatment with hydrogen peroxide and to treatment with air.

$BF_3$ hydrate is a dihydrate of formula $BF_3.2H_2O$ and is employed in accordance with the process of the invention in the form of an aqueous composition referred to as technical $BF_3$ hydrate. This composition essentially comprises a mixture of water and dihydrate along with the abovementioned impurities. It is generally obtained by absorption of the gaseous $BF_3$ in water following its use in various processes of polymerization (poly-α-olefins, petroleum resins, etc.) and by washing the polymer obtained from this polymerization with water. It may also originate from the hydrolysis of used $BF_3$ complexes such as, for example, $BF_3.O(C_2H_5)_2$.

The $BF_3$ content of the technical $BF_3$ hydrate to be treated may vary within wide limits, but for greater ease of upgrading it is preferred to use a technical $BF_3$ hydrate having a concentration of between 35 and 65.3%, preferably between 47 and 65.3% (expressed in weight of $BF_3$ per 100 g of aqueous composition). Unless specified otherwise, the percentages indicated in the present text are percentages by weight.

The $BF_3$ content of the technical $BF_3$ hydrate may also be expressed by the number x of mols of water, corresponding to molecules of free—i.e. uncomplexed—water, per mole of $BF_3$. The above-defined ranges of content by weight for $BF_3$ therefore correspond to a value of x of between approximately 0 and 5 for the broad range and between approximately 0 and 2.2 for the preferred range. The mixture of water and dihydrate present in the technical $BF_3$ hydrate may therefore be defined by the term $BF_3.2H_2O+x\ H_2O$.

If required, one means of attaining this $BF_3$ content consists, as described in the patent EP 364 815, in concentrating a dilute $BF_3$ hydrate by removal of water under vacuum; the concentrated hydrate drawn off at the bottom of the column contains traces of heavy organic substances (content of organic carbon: from approximately 10 to 1000 ppm).

The oleum employed in the process of the invention is a solution of sulphuric anhydride, $SO_3$, in sulphuric acid, the $SO_3$ content of the said solution being between 5 and 65% and, preferably, between 10 and 65%. This content may also be expressed by the number y of moles of $H_2SO_4$ which solubilize 1 mol of $SO_3$. The ranges of $SO_3$ content by weight indicated above therefore correspond to a value of y of between 0.44 and 15.5 and, preferably, between 0.44 and 7.4. The oleum can be defined by the expression: $SO_3+y\ H_2SO_4$.

The preparation of boron trifluoride from the technical $BF_3$ hydrate and oleum (step a) corresponds to the following reaction:

$$(BF_3.2H_2O+xH_2O)+(2+x)[SO_3+yH_2SO_4] \rightarrow {}_3+(2+x+2y+xy)H_2SO_4 \quad (1)$$ 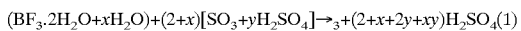

in which x and y are as-defined above.

The amounts of oleum and technical $BF_3$ hydrate reacted in step (a) of the process of the invention are advantageously chosen such that the amount of oleum (expressed in numbers of mol of $SO_3$) divided by the amount of technical hydrate (expressed in total number of mols of free or complex water) is between 0.5 and 1.5 and, preferably, is close to 1.

The reaction of step (a) is generally carried out at a temperature of between 75 and 110° C., preferably between 100 and 110° C.

The gaseous boron trifluoride liberated by the reaction and recovered, in accordance with step (b) of the process of the invention, generally at the top of the reactor, contains neither organic substances nor inert substances such as nitrogen or carbon dioxide. It has all of the characteristics of a commercial product and can be processed for supply in the usual fashion, known per se—by compression, for example.

In accordance with step (c) of the process of the invention, the sulphuric acid produced in step (a) is subjected to treatment with hydrogen peroxide and to treatment with air, the said treatments being carried out in succession and in either order.

The treatment with $H_2O_2$ ensures oxidative destruction of the organic compounds present as impurities in the sulphuric acid produced in step (a), these impurities originating from the technical $BF_3$ hydrate. The chemical reaction employed is:

$$C_{organic} + 2H_2O_2 \rightarrow CO_2 + 2H_2O \qquad (2)$$

in which $C_{organic}$ represents the said organic impurities, also referred to as "carbon of organic origin".

This treatment with $H_2O_2$ advantageously produces a colourless $H_2SO_4$.

The amount of hydrogen peroxide to be used can vary within wide limits. For an economic treatment, this amount is advantageously determined as follows: the weight of carbon of organic origin present in the technical $BF_3$ hydrate employed in step (a) is determined quantitatively using a total organic carbon analyzer. The amount of $H_2O_2$, expressed in numbers of moles, is between 4 and 200 times the number of molar equivalents of carbon of organic origin determined in this way, preferably between 5 and 20 times.

The hydrogen peroxide is generally employed in the form of an aqueous solution whose concentration is between 3 and 70%, preferably between 10 and 70%.

Treatment with $H_2O_2$ is carried out at a temperature of between 80 and 115° C., preferably between 105 and 110° C.

The air treatment of step (c) of the process of the invention makes it possible to remove essentially all of the boron trifluoride dissolved in the sulphuric acid, the preferred objective being to reduce its $BF_3$ content to a value of less than 50 ppm. This treatment is generally carried out by purging. The $BF_3$ thereby released can advantageously be absorbed in water so as to give a $BF_3$ hydrate which can optionally be recycled to step (a) of the process of the invention.

The process of the invention can be operated continuously or batchwise.

If operated batchwise, step (a) of the process of the invention is carried out in a first reactor. The treatment with $H_2O_2$ and the air purging can be carried out in two different reactors or in the same reactor, the said reactor or reactors optionally being that used in step (a). It is possible either to carry out the treatment with $H_2O_2$ first and then the air purging, or vice versa.

When the process is, preferably, operated continuously it is advantageous to use three reactors in series, the first for carrying out the reaction of the oleum with the technical $BF_3$ hydrate and recovering the gaseous $BF_3$ at the top, and the two others for carrying out, in succession but in either order, the treatment with $H_2O_2$ and the air purging.

Preferably, the first reactor is a stirred reactor in which the level of the reaction medium ($H_2SO_4$ 100%) is kept constant by means of an overflow leading into the second reactor.

EXAMPLES

The examples which follow illustrate the invention without limiting it. Unless specified otherwise, the percentages are by weight.

Example 1

An installation is used which comprises two reactors in series. The first reactor has a capacity of 400 ml (200 ml used for volume for the reaction medium) and is equipped with a (4-blade) helical stirrer with a diameter of 4 cm; the rotary speed of the stirrer head is 500 revolutions per minute. This reactor is equipped with a jacket traversed by a heat transfer fluid in order to dissipate the heat of reaction and maintain the temperature at between 104 and 107° C.

The two reactants, technical $BF_3$ hydrate and 65% oleum, are weighed out continuously and introduced into the reactor, which contains an initial charge of 200 ml of 100% sulphuric acid. The technical $BF_3$ hydrate, supplied by means of a peristaltic pump, and the oleum, supplied via a piston-type metering pump, arrive in the reaction medium via two dip tubes arranged side by side. The overflow of the reactor is directed towards a second reactor having the same characteristics as the first (volume, stirring, etc.).

The technical $BF_3$ hydrate has the following characteristics:

$BF_3 = 55.3\%$ $H_2O = 44.7\%$ density = 1.505 and its content of organic carbon is 83 mg per kg of technical $BF_3$ hydrate.

The oleum used assays at 65% $SO_3$ and 35% $H_2SO_4$. The feed rate of technical $BF_3$ hydrate is 214 g/h and that of oleum is 669 g/h, corresponding to a ratio of (number of mols of $SO_3$ in the oleum) to (number of mols of free or complexed water of the $BF_3$ hydrate) of 1. The flow rate of sulphuric acid at the overflow is 773 g/h.

The sulphuric acid emerging from the first reactor is treated in the second reactor with hydrogen peroxide; the amount of $H_2O_2$ employed is 3.1 g/h of 10% $H_2O_2$ and the temperature of the reaction medium is maintained-at between 104 and 107° C.

In order to recover the dissolved $BF_3$ (1.5% by mass) in the sulphuric acid from the second rector this acid is subjected to air purging. The $BF_3$ content of the treated sulphuric acid is less than 50 ppm and the $BF_3$ present in the purging air is absorbed in water in a column and recycled in the form of an aqueous $BF_3$ solution.

After the $BF_3$ has been purged with air, the sulphuric acid assays at 99.9% $H_2SO_4$, and this sulphuric acid, emerging from the second reactor by way of an overflow, is cooled to room temperature.

This installation operated continuously for 7 hours. The $BF_3$ liberated was recovered at the top of the first reactor in a water trap (capacity 5 litres) stirred by means of a magnetic bar. The $BF_3$ trapped in the water was analyzed to determine its contents of organic carbon and of inorganic carbon ($CO_2$ gas). More than 90% of the $BF_3$, initially in the form of $BF_3$ hydrate, was recovered in the form of $BF_3$ gas, which contains less than 5 mg of organic carbon/kg of $BF_3$ gas. No trace of carbon dioxide was detected (detection limit: 1 mg of $CO_2$/kg of $BF_3$ gas). This $BF_3$ has the characteristics of commercial $BF_3$ gas.

The sulphuric acid obtained contains less than 10 mg of organic carbon/kg (detection limit). This grade of sulphuric acid is colourless and is therefore easy to market.

Example 2 (Comparative)

The same process is applied as for Example 1 but without introducing hydrogen peroxide into the second reactor. The $BF_3$ recovered in the first reactor has the characteristics of a commercial $BF_3$ (content of organic carbon of less than 5 mg/kg of $BF_3$, no trace of $CO_2$ detected) but the sulphuric acid emerging from the second reactor is black and contains 20 mg of organic carbon/kg of $H_2SO_4$.

EXAMPLE 3: (COMPARATIVE)

The process of Example 2 is reproduced using a technical $BF_3$ hydrate having the following characteristics:

$BF_3$=47.7%

$H_2O$=52.3% density=1.38 content of organic carbon: 620 mg/kg of technical $BF_3$ hydrate.

The feed rate of the technical $BF_3$ hydrate is 188 g/h and that of the oleum is 681 g/h. The amount of residual sulphuric acid from the overflow of the second reactor is 784 g/h. Before purging of the sulphuric acid, the amount by mass of $BF_3$ is 1.3%. After air purging of the $BF_3$, the sulphuric acid assays at 98.4% $H_2SO_4$ and 1.6% $H_2O$.

The $BF_3$ liberated is recovered at the top of the first reactor in a water trap and the $BF_3$ trapped in the water is analysed in order to determine its contents of organic carbon and of inorganic carbon ($CO_2$ gas); it contains less than 10 mg of organic carbon per kg of $BF_3$.

The sulphuric acid recovered at the overflow of the second reactor contains 155 mg of organic carbon per kg of sulphuric acid. It has a dark-brown colour and is therefore unmarketable.

Example 4: (Comparative)

A technical $BF_3$ hydrate is used which assays at 53.5% $BF_3$ (d=1.47) and contains 780 mg of organic carbon/kg of $BF_3$ hydrate.

The feed rate of the $BF_3$ hydrate in the reactor is 210 g/h and that of the 65% oleum is 667 g/h. 70% hydrogen peroxide is introduced at a rate of 4.1 g/h into this same reactor.

At the overflow of the reactor, the flow of sulphuric acid is 784 g/h. This acid contains 1.1% of $BF_3$. After purging, the sulphuric acid assays at 97.2% $H_2SO_4$ and 2.8% of water.

The $BF_3$ emerging at the top of the reactor contains 5300 mg of $CO_2$ per kg of $BF_3$, making it unsuitable for commercial use. The content of organic carbon in the sulphuric acid is less than 10 mg per kg of acid.

Example 5

The operating technique employed is the same as that described in Example 4 except that the hydrogen peroxide is introduced into the second reactor, with the same rate of 4.1 g/h of 70% $H_2O_2$.

The $BF_3$ emerging at the top of the first reactor has the characteristics of a commercial $BF_3$ (content of organic carbon of less than 5 mg/kg of $BF_3$, no trace of $CO_2$ detected). The sulphuric acid emerging from the second reactor is colourless, contains less than 10 mg of organic carbon per kg of acid, and can therefore be used commercially.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A continuous process for obtaining commercial grade boron trifluoride and commercial grade sulfuric acid, the commercial grade $BF_3$ containing less than 10 mg of organic carbon and less than 5 mg of $CO_2$ per kilogram of said boron trifluoride, and the commercial grade sulfuric acid being colorless and containing less than 50 ppm of $BF_3$, the boron trifluoride and the sulfuric acid being prepared from oleum and a technical $BF_3$ hydrate aqueous composition containing one or more organic contaminants, the continuous process being carried out in at least two reactors operated in series, and comprising in succession the steps of:

(a) first reacting the oleum with the technical $BF_3$ hydrate aqueous composition in a first reactor to form a gaseous $BF_3$ product and a sulfuric acid by-product;

(b) recovering the gaseous $BF_3$ product liberated in step (a) at the top of the first reactor, wherein the gaseous $BF_3$ product contains less than 5 mg of $CO_2$ per kilogram of said $BF_3$ product;

(c) treating the sulfuric acid by-product obtained from step (a) with hydrogen peroxide, and (d) after step (c), treating the sulfuric acid by-product with air to reduce the amount of dissolved $BF_3$ to less than 50 parts per million parts of the sulfuric acid, wherein each of the treating of the sulfuric acid by-product with hydrogen peroxide and with air are carried out in at least one reactor that is different from the first reactor.

2. The process according to claim 1, wherein a $BF_3$ content of the technical $BF_3$ hydrate aqueous composition is between 35 and 65.3%, expressed as a weight of $BF_3$ per 100 g of the aqueous composition.

3. The process according to claim 1, wherein an amount of oleum reacted with the technical $BF_3$ hydrate aqueous composition (expressed in numbers of moles of $SO_3$) divided by an amount of technical $BF_3$ hydrate (expressed in total number of moles of free or complexed water) is between 0.5 and 1.5.

4. The process according to claim 1, wherein the reacting of the oleum with the technical $BF_3$ hydrate aqueous composition in step (a) is carried out at a temperature of between 75 and 110° C.

5. The process according to claim 1, wherein an amount of hydrogen peroxide reacted, expressed as a number of moles, is between 4 and 200 times the number of molar equivalents of carbon of organic origin present in the technical $BF_3$ hydrate aqueous composition.

6. The process according to claim 1, wherein the treating of the sulfuric acid by-product with hydrogen peroxide in step (c) is carried out at a temperature of between 80 and 115° C.

7. The process according to claim 1, wherein the process is operated continuously, and wherein the reaction of the oleum with the technical $BF_3$ hydrate aqueous composition occurs in the first reactor with stirring, in which a level of the reaction medium is kept constant by an overflow communicating with a separate reactor.

8. The process according to claim 2, wherein the $BF_3$ content of the technical $BF_3$ hydrate aqueous composition is between 47 and 65.3%, expressed as a weight of $BF_3$ per 100 g of the aqueous composition.

9. The process according to claim 3, wherein the amount of oleum reacted with the technical $BF_3$ hydrate aqueous composition (expressed in numbers of moles of $SO_3$) divided by an amount of technical $BF_3$ hydrate (expressed in total number of moles of free or complexed water) is about 1.

10. The process according to claim 4, wherein the reacting of the oleum with the technical $BF_3$ hydrate aqueous composition in step (a) is carried out at a temperature of between 100 and 110° C.

11. The process according to claim 5, wherein the amount of hydrogen peroxide is between 5 and 20 times the number of molar equivalents of carbon of organic origin present in the technical $BF_3$ hydrate aqueous composition.

12. The process according to claim 6, wherein the treating of the sulfuric acid by-product with hydrogen peroxide in step (c) is carried out at a temperature-of between 100 and 110° C.

13. The process according to claim 1, wherein the process is carried out in the absence of a decoloring step using active carbon.

14. The process according to claim 1, wherein the $BF_3$ hydrate comprises a dihydrate corresponding to the formula $BF_3 \cdot 2H_2O$.

15. The process according to claim 1, further comprising a preliminary step of concentrating the technical $BF_3$ hydrate aqueous composition containing $BF_3$ hydrate by removal of water under vacuum.

16. The process according to claim 1, wherein the oleum reacted with the technical $BF_3$ hydrate aqueous composition comprises a solution of sulfuric anhydride in sulfuric acid.

17. The process according to claim 16, wherein the sulfuric anhydride content of the solution is between 5 and 65%.

18. The process according to claim 16, wherein the sulfuric anhydride content is between 10 and 65%.

19. The process according to claim 1, wherein step (a) corresponds to the following reaction: $(BF_3 \cdot 2H_2O + xH_2O) + (2+x)[SO_3 + yH_2SO_4] \rightarrow BF_3 + (2+x+2y+xy)H_2SO_4$.

20. The process according to claim 1, wherein the gaseous $BF_3$ product recovered in step (b) does not contain organic substances, nitrogen or carbon dioxide.

21. The process according to claim 1, wherein the treating of the sulfuric acid by-product with hydrogen peroxide and with air is carried out in separate reactors.

22. The process according to claim 1, wherein an amount of hydrogen peroxide to be used is determined by a process comprising:

determining quantitatively a weight of carbon of organic origin present in the technical $BF_3$ hydrate aqueous composition using a total organic carbon analyzer; and determining an amount of hydrogen peroxide, in moles, which is between 4 and 200 times a number of molar equivalents of carbon of organic origin.

23. The process according to claim 22, wherein the amount of hydrogen peroxide, expressed in moles, is between 5 and 20 times the number of molar equivalents of carbon of organic origin.

24. The process according to claim 1, wherein the hydrogen peroxide is provided as an aqueous solution having a concentration between 3 and 70%.

25. The process according to claim 22, wherein the hydrogen peroxide is provided as an aqueous solution having a concentration between 3 and 70%.

26. The process according to claim 1, wherein the resulting sulfuric acid assays at 99.9% purity.

27. The process according to claim 1, wherein the resulting sulfuric acid contains less than 10 mg of organic carbon per kilograms.

* * * * *